(12) United States Patent
Bruin et al.

(10) Patent No.: US 12,145,659 B2
(45) Date of Patent: Nov. 19, 2024

(54) TRAILER FAIRING BRACKET

(71) Applicant: ZF CV SYSTEMS EUROPE BV, Brussels (BE)

(72) Inventors: James Bruin, Rochester Hills, MI (US); James D. Haws, Oakville (CA)

(73) Assignee: ZF CV SYSTEMS EUROPE BV, Brussels (BE)

( * ) Notice: Subject to any disclaimer, the term of this patent is extended or adjusted under 35 U.S.C. 154(b) by 299 days.

(21) Appl. No.: 17/732,789

(22) Filed: Apr. 29, 2022

(65) Prior Publication Data

US 2023/0347991 A1  Nov. 2, 2023

(51) Int. Cl.
 *B62D 35/00* (2006.01)
(52) U.S. Cl.
 CPC ......... *B62D 35/001* (2013.01); *B62D 35/008* (2013.01)
(58) Field of Classification Search
 CPC ............................. B62D 35/001; B62D 35/008
 USPC ........................................... 296/180.4, 180.5
 See application file for complete search history.

(56) References Cited

U.S. PATENT DOCUMENTS

| | | | | |
|---|---|---|---|---|
| 8,608,122 B2* | 12/2013 | Mancina | ................... | F16B 2/14 248/228.2 |
| 8,727,425 B1* | 5/2014 | Senatro | ................ | B62D 35/001 296/180.1 |
| D818,415 S * | 5/2018 | Haws | .......................... | D12/223 |
| 10,220,888 B2* | 3/2019 | Haws | ...................... | F16B 2/065 |
| 10,640,156 B2* | 5/2020 | Boivin | ................. | B62D 35/001 |
| 2012/0211617 A1* | 8/2012 | Mancina | ................... | F16B 2/12 248/231.31 |
| 2016/0068202 A1* | 3/2016 | Senatro | ................ | B62D 35/008 296/180.4 |
| 2019/0152541 A1* | 5/2019 | Haws | ................... | B62D 35/001 |
| 2020/0040925 A1 | 2/2020 | Mancina et al. | | |
| 2020/0223497 A1* | 7/2020 | Boivin | ................. | B62D 35/001 |

* cited by examiner

*Primary Examiner* — Jason S Daniels
(74) *Attorney, Agent, or Firm* — WARNER NORCROSS + JUDD LLP

(57) ABSTRACT

A trailer fairing bracket for mounting an aerodynamic side fairing to a cargo trailer includes a support strut having a main body. An outwardly extending clamping wedge portion extends generally perpendicular to the main body. The main body is configured to support a trailer side fairing. The main body includes an elongated center portion having first and second ends, a central axis extending between the first and second ends, a lower skirt-mounting portion proximate the first end and extending perpendicular to the central axis, and an upper skirt-mounting portion disposed at the second end extending perpendicular to the central axis. The support strut is of a single molded piece construction. A pair of side clamping members cooperate with the clamping wedge portion of the support strut for securing the support strut to a cargo trailer.

21 Claims, 11 Drawing Sheets

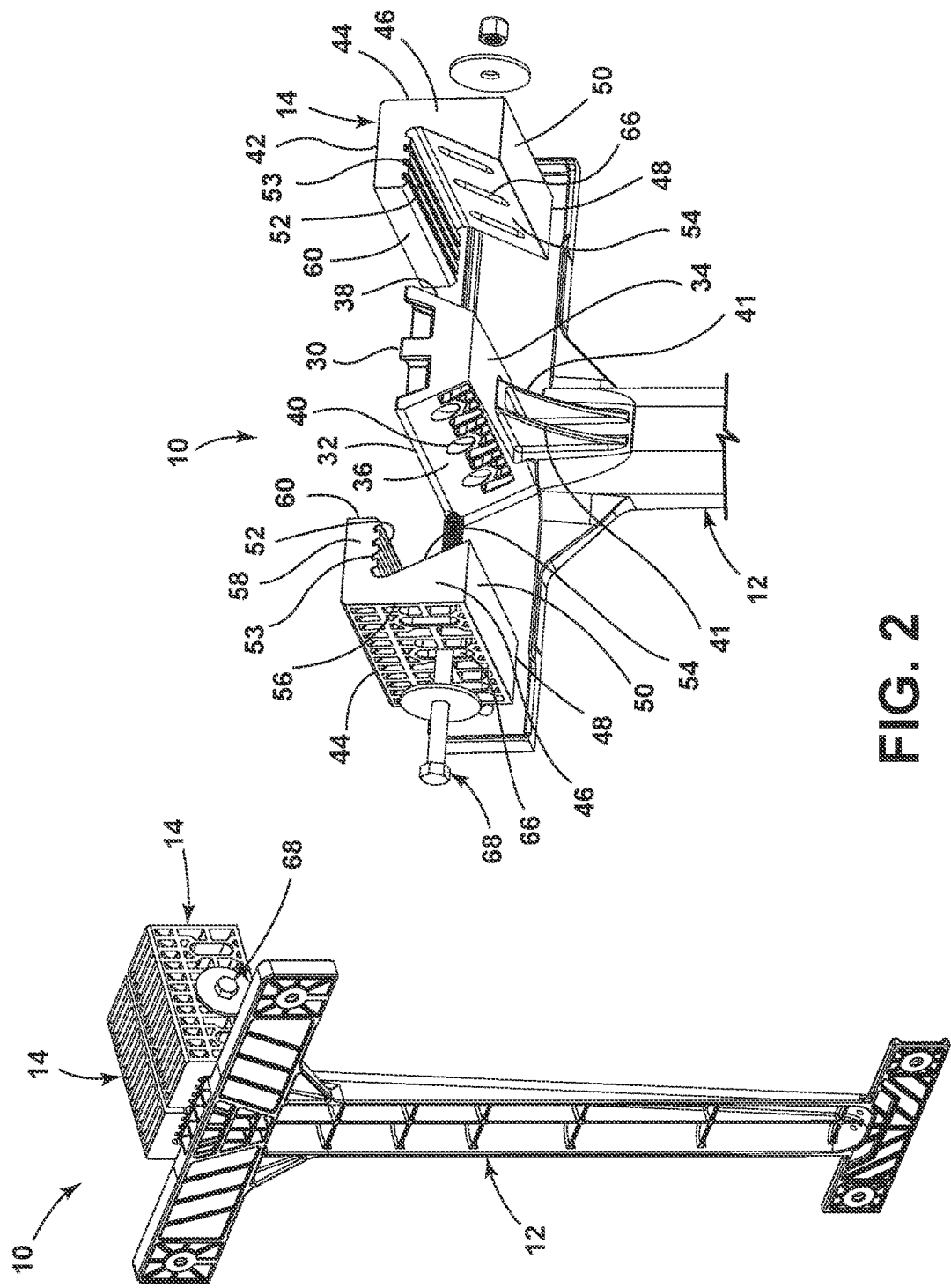

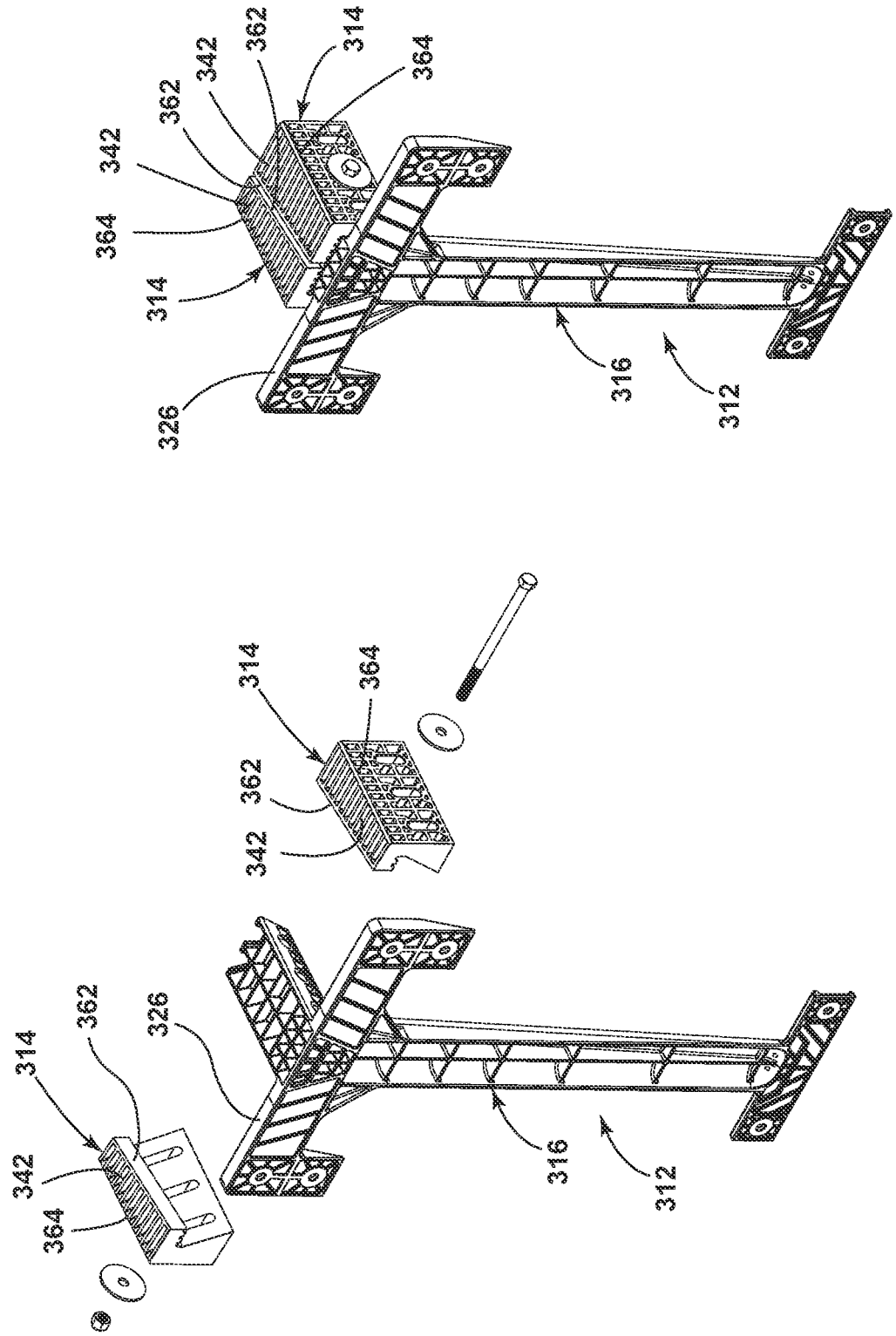

TRAILER FAIRING BRACKET

FIELD OF THE INVENTION

The disclosure generally relates to trailer aerodynamic side fairings and, more specifically, to a trailer fairing bracket for mounting a side fairing on a cargo trailer.

BACKGROUND OF THE INVENTION

Trailer side fairings, also known as trailer skirts, are commonly installed on the sides of a cargo trailer underneath the cargo trailer body in order to reduce aerodynamic drag, by blocking the flow of air from the sides of the trailer to below the trailer during movement. Side fairings may be flat sheets of composite or metallic materials, may be formed or molded panels, and/or may also have an S-shape. Side fairings may be installed on a cargo trailer using brackets that are connected to the underside of the floor structure of the trailer such as the trailer floor I-beams. One type of bracket includes two main components, an upper trailer mounting component and a lower fairing mounting component, each formed of a different material and connected together by one or more fasteners. However, this bracket requires the use of multiple materials and additional fasteners, which increases assembly time and cost, both for the manufacturer and end user. Also, the fastener(s) that connect the upper and lower components together may be improperly assembled by an end user, which can lead to partial or complete failure of the system.

BRIEF SUMMARY

An improved trailer fairing bracket is provided that eliminates the use of multiple materials to form the bracket and that eliminates the fastener(s) that previously were required to connect together the trailer mounting component and the fairing mounting component of the bracket. The trailer mounting component and the fairing mounting component of the improved fairing bracket are formed of a single material and are formed as an integral, unitary, single piece construction.

In specific embodiments, a trailer fairing bracket for mounting an aerodynamic side fairing to a cargo trailer includes a support strut having a main body, and an outwardly extending clamping wedge portion extending generally perpendicular to the main body. The main body is configured to support a trailer side fairing. The main body includes an elongated center portion having first and second ends, a central axis extending between the first and second ends, a lower skirt-mounting portion proximate the first end and extending perpendicular to the central axis, and an upper skirt-mounting portion disposed at the second end extending perpendicular to the central axis. The support strut is of a single molded piece construction. A pair of side clamping members cooperate with the clamping wedge portion of the support strut for securing the support strut to a cargo trailer.

In particular embodiments, the support strut is formed by injection molding, each side clamping member is formed by injection molding, or both.

In particular embodiments, the main body has a T-shape, an H-shape or an I-shape.

In particular embodiments, each side clamping member includes a top surface extending from a first end to a second end, the top surface having an inner edge and an outer edge each extending from the first end to the second end, wherein the inner edge is either parallel or angled relative to the outer edge.

In other specific embodiments, a trailer fairing bracket for mounting an aerodynamic side fairing to a cargo trailer includes a support strut formed of a single molded piece. The support strut includes a main body generally lying in a plane and an outwardly extending clamping wedge portion extending generally perpendicular to the plane of the main body. The main body includes an elongated center portion having first and second ends, a central axis extending between the first and second ends, a lower skirt-mounting portion at the first end extending perpendicular to the central axis, and an upper skirt-mounting portion at the second end extending perpendicular to the central axis. The clamping wedge portion includes a pair of opposite, side-facing angled surfaces, and the clamping wedge portion is disposed at the second end of the center portion of the main body. A pair of side clamping blocks are adjustably connected to the clamping wedge portion of the support strut. Each of the side clamping blocks includes an inwardly facing angled surface that is inclined at the same angle as one of the angled surfaces of the clamping wedge portion. Each side clamping block includes a top surface extending from a first end of the side clamping block to a second end of the side clamping block. The top surface has an inner edge and an outer edge each extending from the first end to the second end. The inner edges of the side clamping blocks are either both parallel to the outer edges or both angled relative to the outer edges.

In particular embodiments, the clamping wedge portion of the support strut includes at least one through hole for connection of the side clamping blocks to the clamping wedge portion.

In certain embodiments, each side clamping block includes at least one slot corresponding to the at least one through hole of the clamping wedge portion.

In specific embodiments, at least one fastener adjustably attaches the side clamping blocks to the clamping wedge portion of the support strut via the at least one through hole and the at least one slot.

In particular embodiments, each side clamping member includes an engagement surface opposite the top surface for engagement with a surface of a cargo trailer.

In specific embodiments, the engagement surface of each side clamping block includes a plurality of grooves extending from the first end to the second end of the side clamping block.

In particular embodiments, each side clamping block has a wedge-shaped connection portion including the inwardly facing angled surface, and a planar top portion including the top surface and the engagement surface. The inwardly facing angled surface is tapered toward the top surface, and the connection portion of each side clamping block cooperates with the clamping wedge portion of the support strut.

In particular embodiments, the top surface of each side clamping block has one of a rectangular shape or a trapezoidal shape.

In particular embodiments, the clamping wedge portion of the support strut has an isosceles trapezoidal cross-sectional shape.

In particular embodiments, the lower skirt-mounting portion is shorter in length than the upper skirt-mounting portion.

In particular embodiments, the lower skirt-mounting portion and the upper skirt-mounting portion of the support strut each include at least one mounting aperture for mounting a trailer side fairing on the support strut.

In particular embodiments, the support strut is generally symmetric about the central axis.

In particular embodiments, the elongated center portion of the main body extends beyond the lower skirt-mounting portion, and the elongated center portion includes at least one mounting aperture below the lower skirt-mounting portion for mounting a trailer side fairing on the support strut.

In particular embodiments, the support strut includes a rebound gusset extending between the clamping wedge portion and the main body.

A method of manufacturing a trailer fairing bracket is also provided. The trailer fairing bracket includes a support strut having a main body, and an outwardly extending clamping wedge portion extending generally perpendicular to the main body. The main body is configured to support a trailer side fairing. The main body includes an elongated center portion having first and second ends, a central axis extending between the first and second ends, a lower skirt-mounting portion proximate the first end and extending perpendicular to the central axis, and an upper skirt-mounting portion disposed at the second end extending perpendicular to the central axis. The trailer bracket also includes a pair of side clamping members that cooperate with the clamping wedge portion of the support strut for securing the support strut to a cargo trailer. The method includes forming at least one of the support strut and the pair of side clamping members by injection molding, wherein each of the support strut and the side clamping members are of a single molded piece construction.

In particular embodiments, the method includes providing a mold having a plurality of inserts that allows for the production of a plurality of configurations of the support strut using the mold.

A trailer side fairing system is also provided. The system includes a plurality of the fairing brackets. Each fairing bracket is mounted on an I-beam of a cargo trailer floor frame. An aerodynamic side fairing skirt is mounted on the plurality of fairing brackets.

DESCRIPTION OF THE DRAWINGS

Various advantages and aspects of this disclosure may be understood in view of the following detailed description when considered in connection with the accompanying drawings, wherein:

FIG. 1 is a rear perspective view of a trailer fairing bracket in accordance with some embodiments of the disclosure;

FIG. 2 is a partial front exploded view of the trailer fairing bracket of FIG. 1 as viewed from below;

FIG. 13 is a rear exploded view of another trailer fairing bracket in accordance with some embodiments of the disclosure;

FIG. 14 is a rear perspective view of the trailer fairing bracket of FIG. 13;

DETAILED DESCRIPTION OF THE INVENTION

Figure 5:
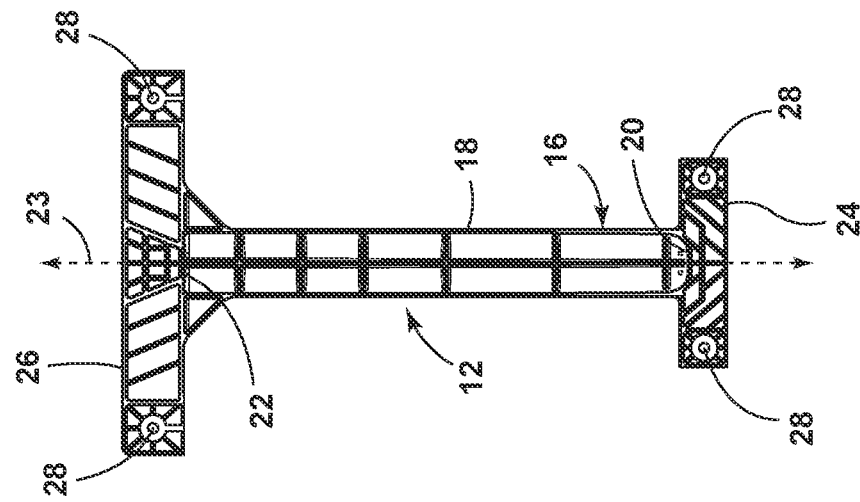
FIG. 5 is a rear plan view of the support strut of the trailer fairing bracket of FIG. 1.
Figure 4:
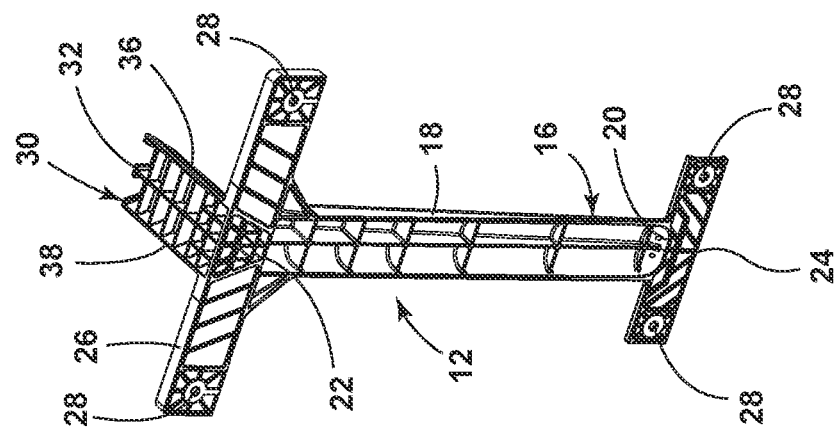
FIG. 4 is a rear perspective view of the support strut of the trailer fairing bracket of FIG. 1.
Figure 3:
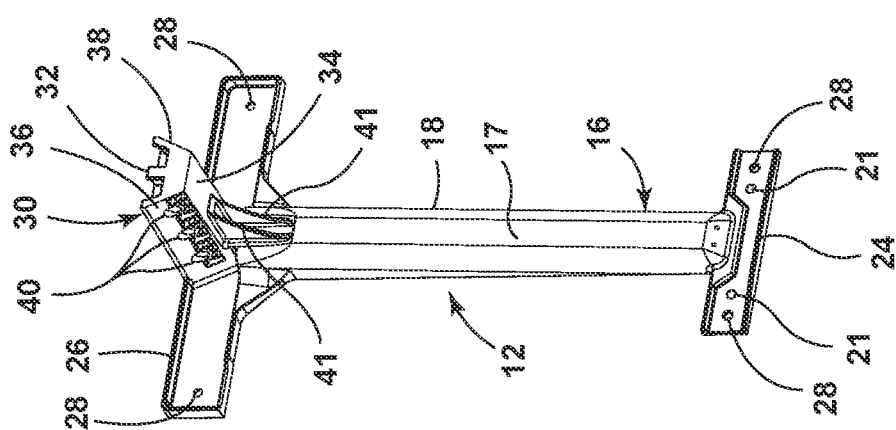
FIG. 3 is a front perspective view of a support strut of the trailer fairing bracket of FIG. 1.
Figure 6:
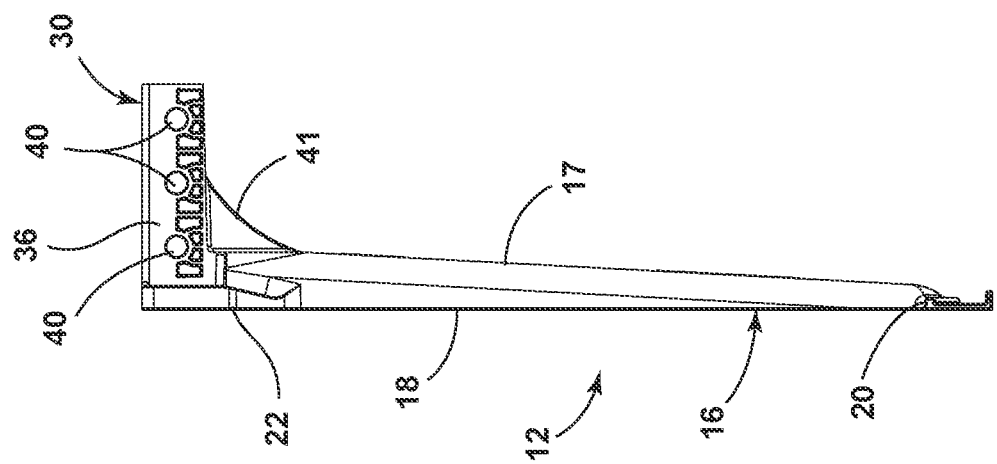
FIG. 6 is a side view of the support strut of the trailer fairing bracket of FIG. 1.

A trailer fairing bracket is provided. Referring to FIGS. 1-17, wherein like numerals indicate corresponding parts throughout the several views and embodiments, the trailer fairing bracket is illustrated and generally designated at 10. Certain features of the trailer fairing bracket 10 are functional, but can be implemented in different aesthetic configurations. The trailer fairing bracket 10 provides one or more of improved construction and reduced cost.

As shown particularly in FIGS. 1-8, the trailer fairing bracket 10 includes a support strut 12 and a pair of side clamping members 14. The support strut 12 is formed as an integral, unitary, single, monolithic, molded piece construction. For example, the support strut 12 may be formed by injection molding or a similar molding process. The support strut 12 includes a main body 16 that is configured to support a trailer side fairing. Specifically, the main body 16 is generally planar and lies in a plane. The main body 16 includes an elongated center portion 18 having a first longitudinal end 20 and a second longitudinal end 22 in the elongated longitudinal (length) direction. While the main body 16 is generally planar (flat), a forward facing surface 17 of the center portion 18 may be tapered from the second end 22 towards the first end 20 such that the thickness of the center portion decreases from the second end towards the first end. A central axis 23 extends between the first and second ends 20, 22 and through the longitudinal center of the main body in the longitudinal length direction of the main body. The main body 16 further includes a lower skirt-mounting portion 24 disposed at or proximate the first end 20, and an upper skirt-mounting portion 26 disposed at or proximate the second end 22, such that the mounting portions 24, 26 are spaced from each other. The lower skirt-mounting portion 24 provides for reduced vibration caused by wind forces acting against a side fairing during use. The lower and upper skirt-mounting portions 24, 26 extend generally perpendicular to the central axis 23. The lower skirt-mounting portion 24 may be shorter in length (in the direction perpendicular to the central axis 23) than the upper skirt-mounting portion 24, and the center portion 18 of the main body 16 may be longer than each of the lower and upper skirt-mounting portions. The support strut 12 is also generally symmetric about the central axis 23. Thereby, the main body 16 may have a T-shape, an H-shape, or an I-shape.

Figure 10:
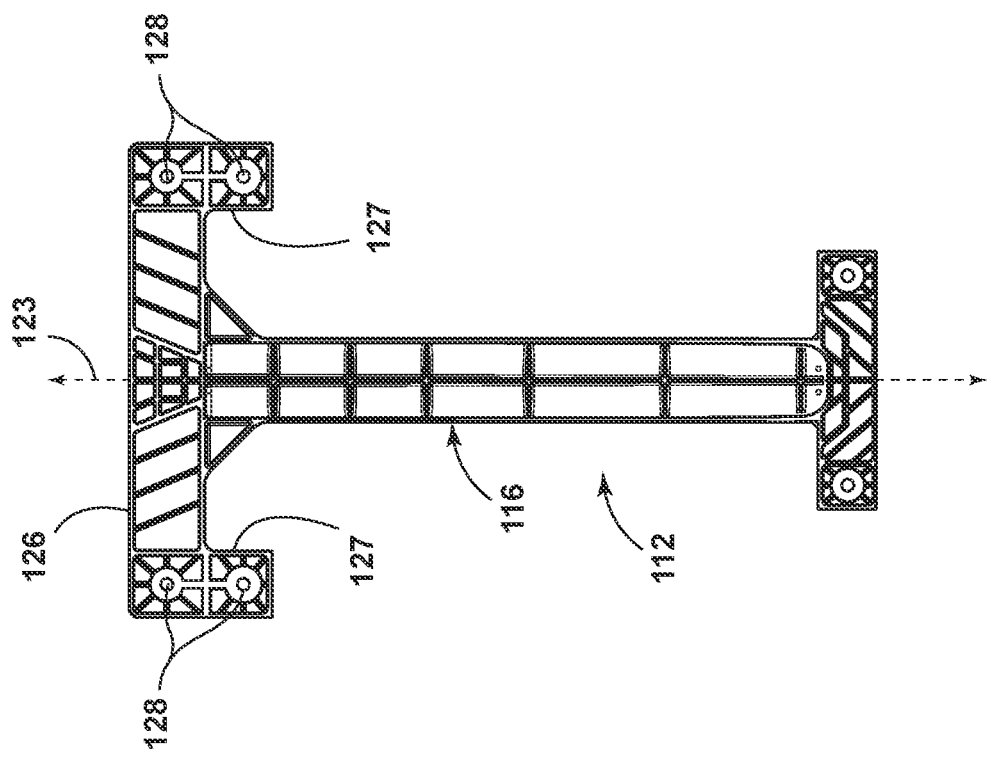
FIG. 10 is a rear plan view of a support strut of the trailer fairing bracket of FIG. 9.
Figure 9:
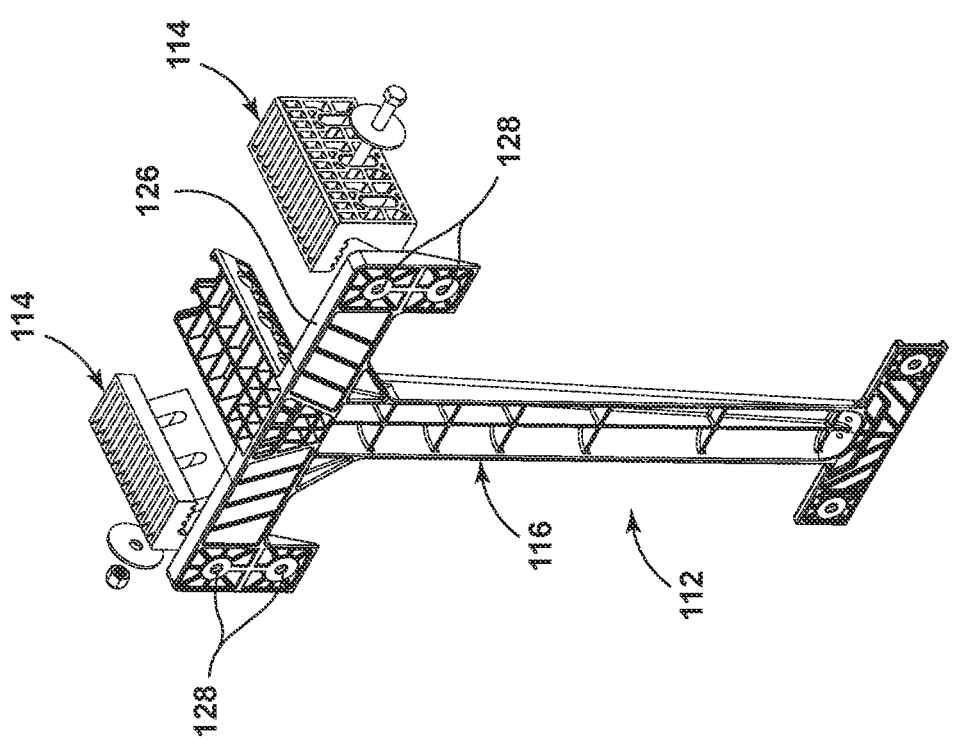
FIG. 9 is a rear exploded view of another trailer fairing bracket in accordance with some embodiments of the disclosure.

The lower skirt-mounting portion 24 and the upper skirt-mounting portion 26 each include at least one mounting aperture 28 adapted and sized for mounting a trailer side fairing on the support strut 12. The mounting apertures 28 are sized to receive and hold a fastener such as a screw, bolt, or similar that is inserted through both the trailer side fairing and the mounting apertures in order to mount and secure the trailer side fairing on the support strut 12. In some embodiments, the lower skirt-mounting portion 24 includes one of the mounting apertures 28 on each of its longitudinal ends, the mounting apertures 28 being spaced from the central axis in a direction transverse to the central axis 23. In certain embodiments, the lower skirt-mounting portion 24 may include a pair of blind holes 21 inward of the mounting apertures 28. In some embodiments, the upper skirt-mounting portion 26 may also include one of the mounting apertures 28 on each of its longitudinal ends, the mounting apertures 28 being spaced from the central axis in a direction transverse to the central axis 23. In certain embodiments as shown in FIGS. 9 and 10, the upper skirt-mounting portion 126 of the main body 116 of the support strut 112 may include two mounting apertures 128 at each of its longitudinal ends, with one of the apertures 128 being disposed below the other aperture at each end such that the upper skirt-mounting portion has a serif 127 at each end, i.e. a small portion that extends down from the upper skirt-mounting portion in a direction perpendicular to the longitudinal direction of the upper skirt-mounting portion and parallel to the central axis 123.

Figure 12:
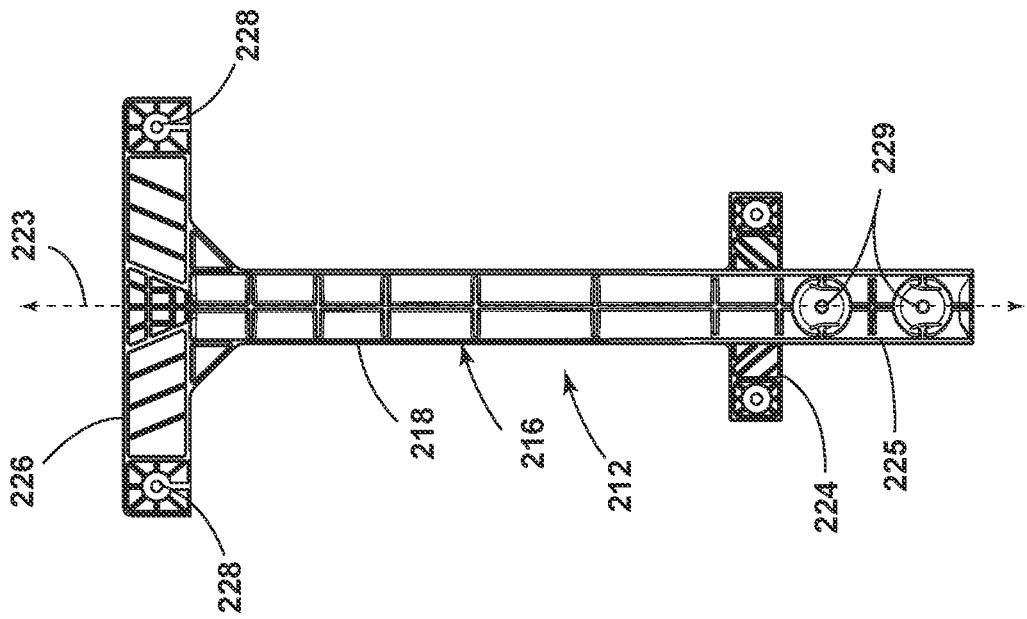
FIG. 12 is a rear plan view of a support strut of the trailer fairing bracket of FIG. 11.
Figure 11:
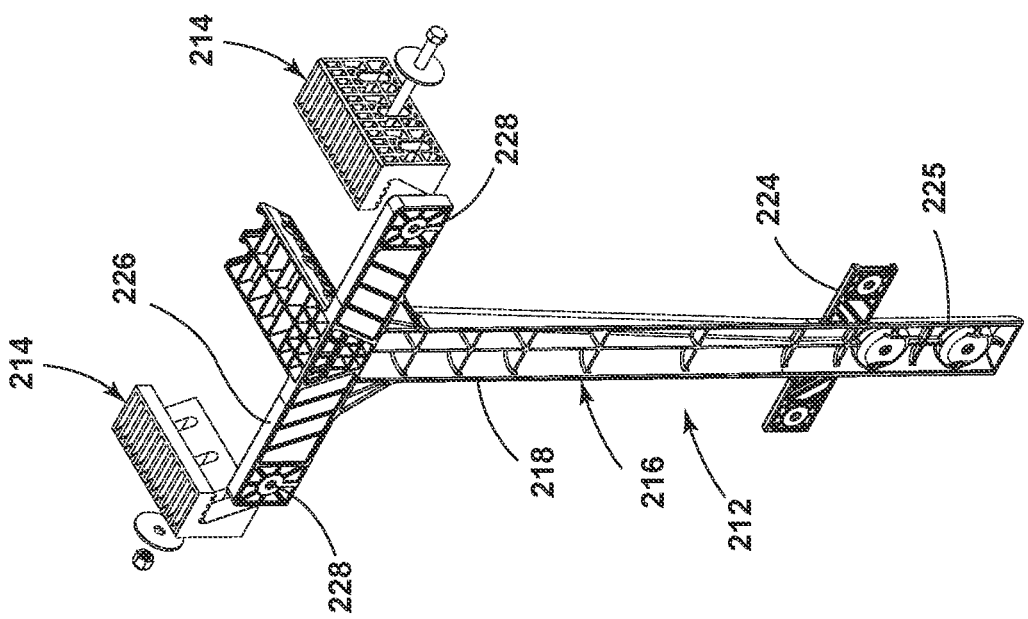
FIG. 11 is a rear exploded view of another trailer fairing bracket in accordance with some embodiments of the disclosure.

In some specific embodiments as shown in FIGS. 11 and 12, the center portion 218 of the main body 216 of the support strut 212 may extend and thus include a short extension 225 beyond and below the lower skirt-mounting portion 224 in the longitudinal direction along the central axis 223. In these embodiments, the center portion 218 may include at least one, and preferably two, mounting apertures 229 in the extension 225 below the lower skirt-mounting portion 224.

Returning to FIGS. 1-8, the support strut 12 further includes an outwardly extending clamping wedge portion 30 that extends generally perpendicular to the central axis 23 and perpendicular to the plane in which the main body 16 lies. As discussed above, the support strut 12 is of a single piece construction and hence the clamping wedge portion 30 is integrally formed with the main body 16. Significantly, since the main body 16 and clamping wedge portion 30 are integrally formed together, the support strut 12 does not include a fastener or other similar, separate attachment member that connects the main body 16 to the clamping wedge portion 30. The clamping wedge portion 30 is disposed at the second end 22 of the center portion 18 of the main body 16 in the vicinity of the upper skirt-mounting portion 26, and is generally symmetrically disposed about and relative to the central axis 23. The clamping wedge portion 30 is generally wedge-shaped and may have an isosceles trapezoidal or similar trapezoidal cross-sectional shape. In this regard, the clamping wedge portion 30 includes a pair of parallel top and bottom surfaces 32, 34 and a pair of opposite, side-facing, non-parallel, angled surfaces 36, 38. The angled side surfaces 36, 38 are angled relative to the central axis 23 of the main body 16 such that side surfaces are tapered toward the central axis in a direction from the second end 22 of the main body to the first end 20 of the main body. The clamping wedge portion 30 includes at least one through hole 40 that extends from one of the angled side surfaces 36 to the other angled side surface 38 in a direction transverse to the central axis 23 and transverse to the direction of extension of the clamping wedge portion. In some embodiments, the clamping wedge portion 30 includes three of the through holes 40 spacedly disposed from each other in a row along the side surfaces 36, 38. As described in more detail below, the through hole(s) 40 in the clamping wedge portion 30 allow for the connection of the side clamping members 14 to the clamping wedge portion.

In some embodiments, as shown for example in FIGS. 2, 3, 6, and 8, the support strut 12 includes a rebound gusset 41 that extends between the bottom surface 34 of the clamping wedge portion 30 and the forward facing surface 17 of the main body 16. The rebound gusset 41 improves the performance of the support strut 12 to return to its original position when the lower portion 24 of the strut is pushed inwards, thereby flexing the center portion 18 of the strut, as described in more detail below.

Figure 7:
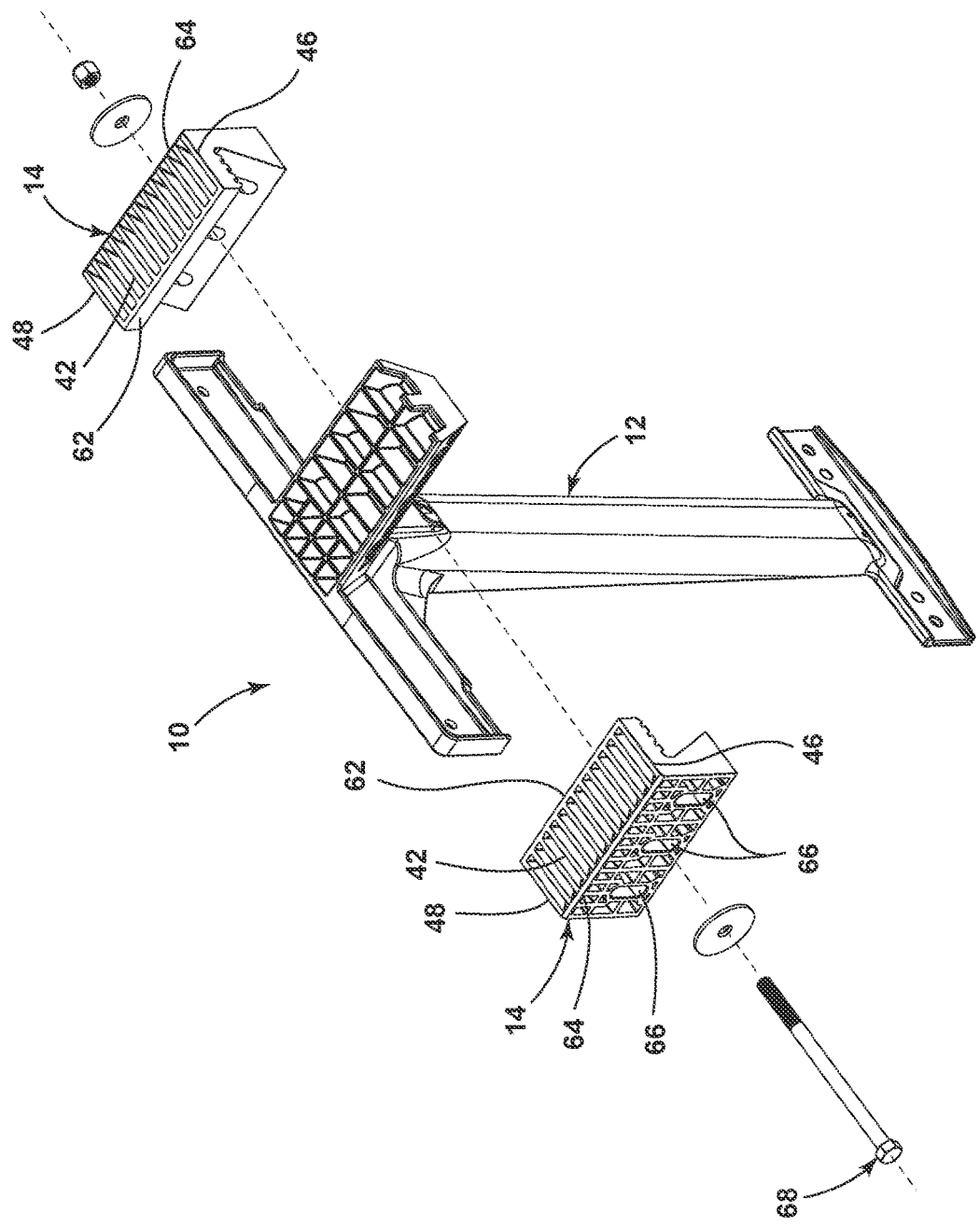
FIG. 7 is a front exploded view of the trailer fairing bracket of FIG. 1 as viewed from above.
Figure 8:
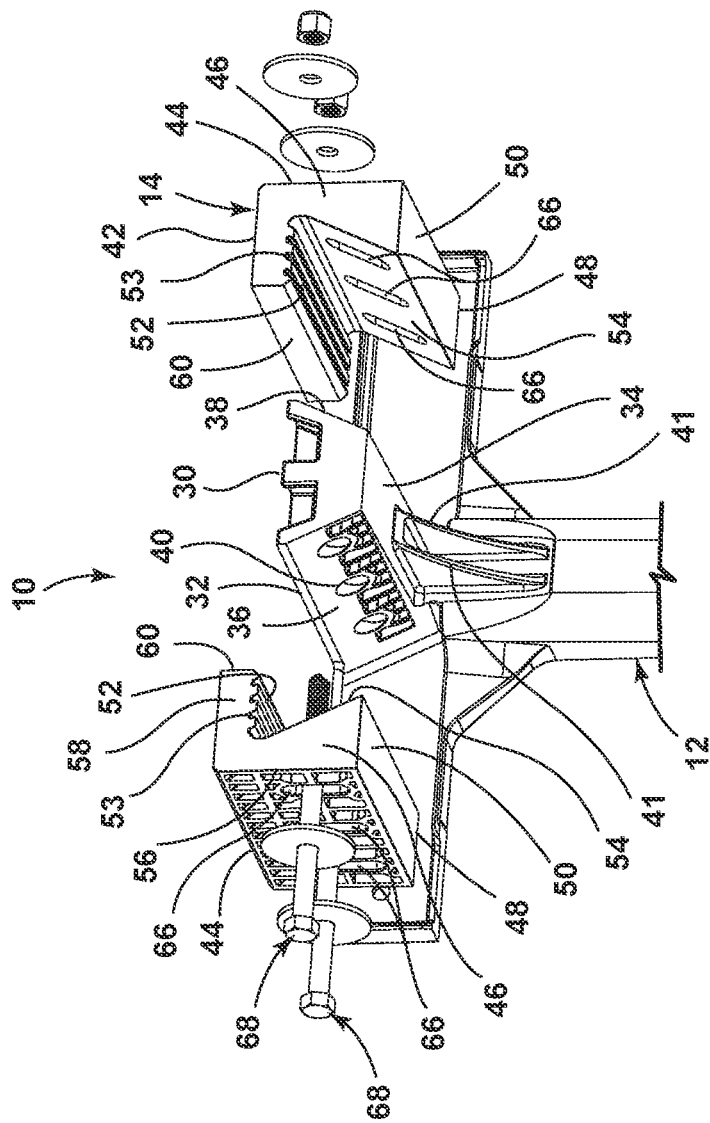
FIG. 8 is a partial front exploded view of a trailer fairing bracket in accordance with certain embodiments of the disclosure, as viewed from below.

Each side clamping member 14 of the fairing bracket 10 is generally formed in the shape of an inverted L-shaped block. Each side clamping member 14 has a top surface 42, an outer side surface 44, and first and second end surfaces 46, 48, all of which are in mutually perpendicular relationship to one another. A bottom surface 50 is parallel to the top surface 42, and a lower clamping engagement surface 52 is also parallel to the top surface 42. The clamping engagement surface 52 may include a plurality of corrugations or grooves 53 extending from the first end 46 to the second end 48 which aid in the engagement with a surface of a cargo trailer as discussed in more detail below. An inwardly facing, angled wedge surface 54 extends downwardly and outwardly from its intersection with the clamping engagement surface 52 to its intersection with the bottom surface 50, such that the angled surface 54 is tapered toward the top surface 42. Thus, each clamping member 14 has a wedge-shaped connection portion 56 including the bottom surface 50, the inwardly facing angled surface 54, and parts of the outer side surface 44 and end surfaces 46, 48, as well as a planar top portion 58 including the top surface 42, the engagement surface 52, an inner side surface 60, and parts of the outer side surface 44 and end surfaces 46, 48. The top surface 42 of each clamping member 14 extends from the first end 46 to the second end 48, and has an inner edge 62 and an outer edge 64 each extending from the first end to the second end. The inner edge 62 is either parallel to or angled relative to the outer edge 64. Thus, the top surface 42 of each side clamping member 14 has either a rectangular shape or a trapezoidal shape, the significance of which will be described in more detail below. For example, as shown in FIG. 7, the inner edges 62 of the side clamping members 14 may be parallel to the outer edges 64, and the top surface 42 may be shaped as a rectangle. On the other hand, as shown by example in FIGS. 13 and 14, the inner edges 362 of the side clamping members 314 of the support strut 312 may be angled/inclined relative to the outer edges 364 (i.e. not parallel to the outer edges) and the top surface 342 may be shaped as a trapezoid.

Each side clamping member 14 is adjustably connectable to the clamping wedge portion 30 of the support strut 12. Particularly, each side clamping member 14 includes at least one slot 66 corresponding to the at least one through hole 40 of the clamping wedge portion 30. For example, in the case that the clamping wedge portion 30 includes three through holes 40, each side clamping member 14 correspondingly includes three slots 66 that are alignable with the through holes 40. At least one fastener 68 such as a nut and bolt arrangement (and also optionally including washers) may be inserted through a slot 66 of each side clamping member 14 and one of the through holes 40 of the clamping wedge portion 30 to adjustably attach and secure the side clamping members to the clamping wedge portion. The side clamping members 14 may be attached to the clamping wedge portion 30, for example, by one fastener 68 as shown in FIGS. 1, 2, and 7, and by two fasteners 68 as shown by example in FIG. 8. The inwardly facing angled surface 54 of each side clamping member 14 is parallel to one of the angled surfaces 36, 38 of the clamping wedge portion 30 in an assembled configuration, such that the side clamping members 14 may be disposed on each and either side of the clamping wedge portion and the clamping wedge portion is sandwiched between the side clamping members. The angled surfaces 36, 38 of the clamping wedge portion 30 and the angled surfaces 54 of the side clamping members 14 may be cooperatively inclined 15 to 45 degrees relative to a vertical line (i.e. the central axis 23), more preferably between 20 and 30 degrees, thereby providing for the parallel alignment of the surfaces 36, 38, 54 in the assembled configuration. In other words, the angled surfaces 54 of the side clamping members 14 are inclined at generally the same angle as the angled surfaces 36, 38 of the clamping wedge portion 30 relative to the central axis 23. Hence, the connection portion 56 of each side clamping member 14 cooperates with the clamping wedge portion 30, and the side clamping members may slide along the clamping wedge portion.

Figure 15:
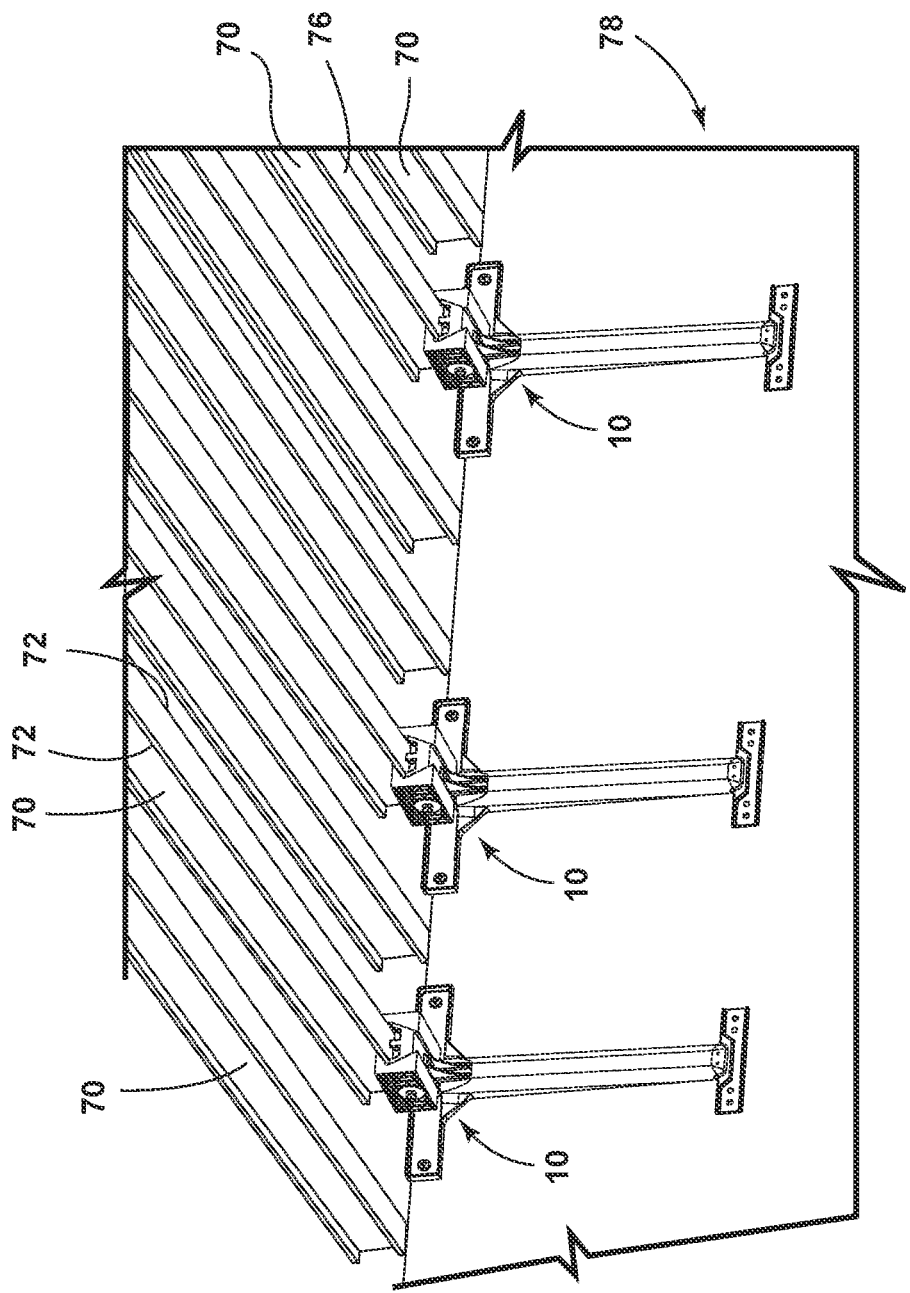
FIG. 15 is a partial perspective view of a trailer side fairing system in accordance with some embodiments of the disclosure including the trailer fairing bracket of FIG. 1.
Figure 16:
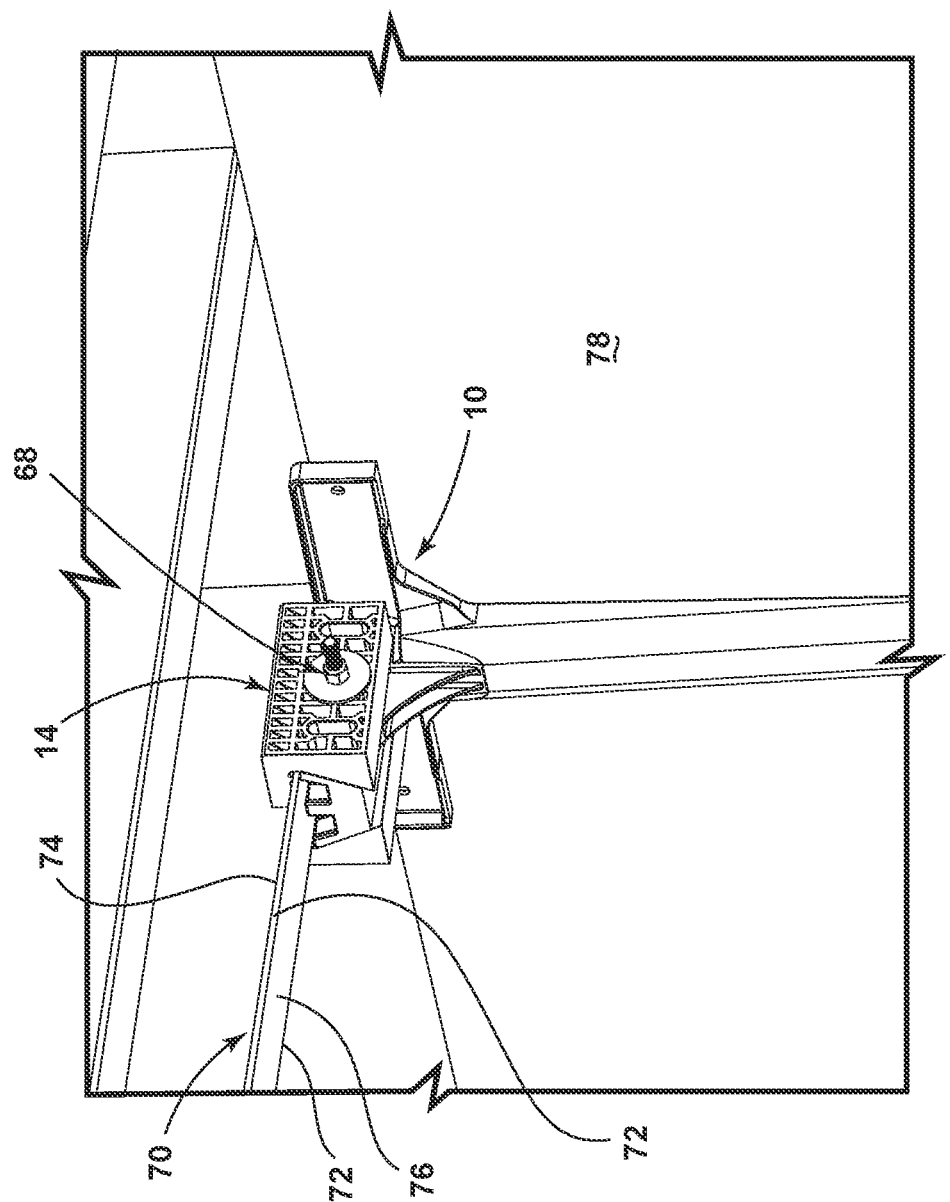
FIG. 16 is a partial perspective view of a portion of the trailer side fairing system of FIG. 15.
Figure 17:
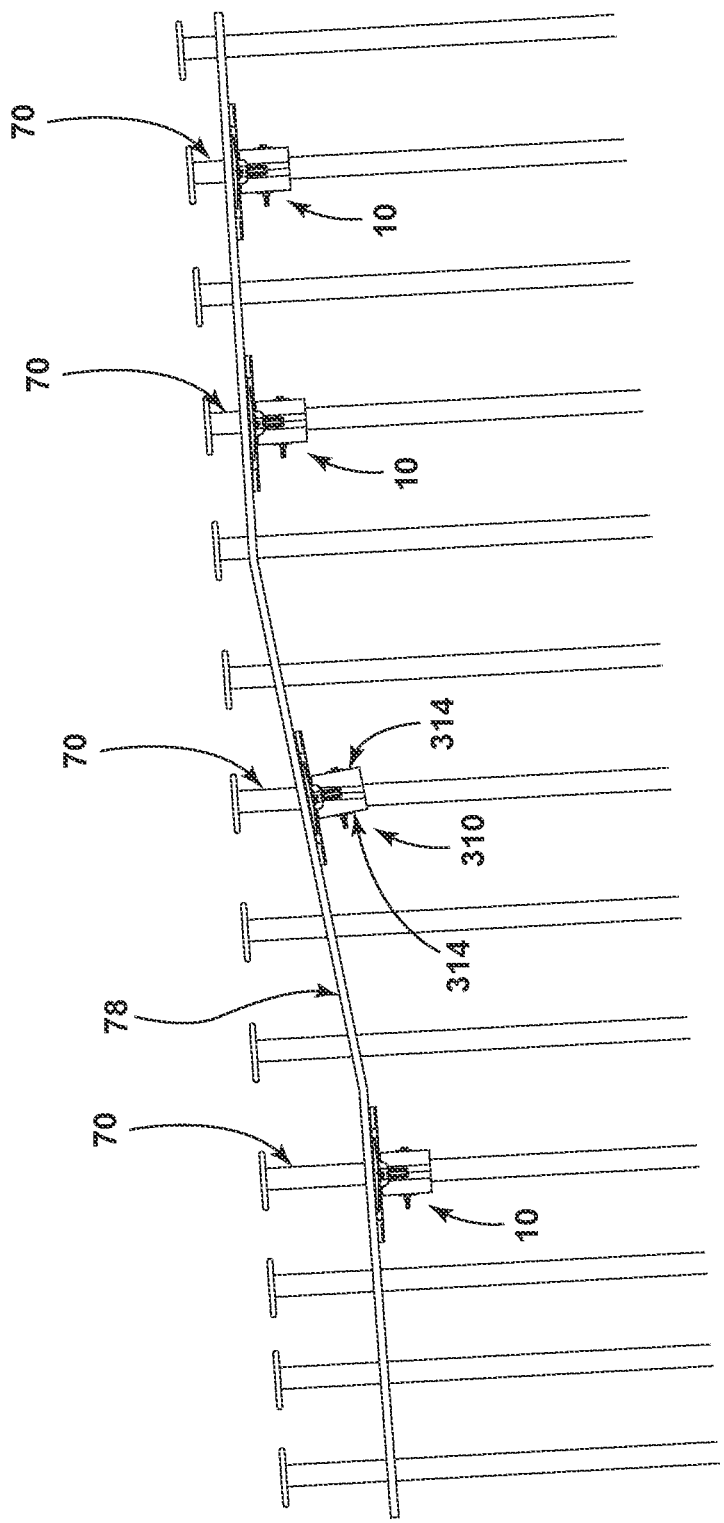
FIG. 17 is a partial schematic view of a trailer side fairing system in accordance with certain embodiments of the disclosure.

The trailer fairing bracket 10 may be used to mount a trailer side fairing to a cargo trailer. As shown in FIGS. 15-17, cargo trailers typically have a frame including a plurality of I-beams 70 that support the underside of the trailer floor. In order to mount the side fairing along the underside of the trailer, a plurality of the fairing brackets 10 are secured to freely accessible pairs of opposed flanges 72 of the I-beams (the flanges being the lower, flat, horizontal portion of the I-beam). When the side clamping members 14 and the clamping wedge portion 30 are assembled together with the fastener 68, and are placed so that the respective lower engagement surfaces 52 of the pair of side clamping members face a respective upper surface 74 of the pair of opposed flanges 72 of the I-beam 70, the respective angled surfaces 54 of the side clamping members 14 face respective angled side surfaces 36, 38 of the clamping wedge portion 30. Tightening of the fastener 68 which is passed through a combination of openings (slots 66 and through hole 40) causes a sliding and wedging action of the angled side surfaces 36, 38 of the clamping wedge portion 30 relative to and in opposition to the angled surfaces 54 of the respective side clamping members 14. Thus, a clamping action is secured between the side clamping members 14 and through the width of the clamping wedge portion 30. Also, a clamping action is induced between the top surface 32 of the clamping wedge portion 30 and the bottom surface 76 of the respective I-beam 70 to which the fairing bracket is attached, as well as between the engagement surface 52 of the side clamping members 14 and the upper surface 74 of the I-beam. The corrugations/grooves 53 in the engagement surface 52 provide additional grip on the I-beam 70. The clamping action secures the fairing bracket 10 in place on the opposed lower plate (flange) portions of I-beam 70. In this manner, the fairing bracket 10 can accommodate I-beams having different heights, widths, and thicknesses.

Once a plurality of the fairing brackets 10 are installed as described above, a trailer side fairing 78 may be mounted on the fairing brackets via fasteners inserted through the side fairing and one or more of the mounting apertures 28, 29 in the bracket main body 16. The side fairing is thus secured to the cargo trailer, and is disposed along the outer edges of the underside of the cargo trailer. If and when the lower portion of the side fairing 78 is pushed inwards towards the centerline of the trailer (such as by an object in the roadway), which causes the center portion 18 and lower portion 24 of the support strut 12 to flex, the rebound gussets 41 strengthen the support strut and aid the support strut in returning to its original position.

In some embodiments, the trailer side fairing may be generally planar. In this case, the main body 16 of support strut 12 of the bracket 10 should be positioned essentially parallel to the side of the cargo trailer, and essentially perpendicular to the longitudinal axis of the I-beam. Thus, the inner edges 62 of the two side clamping members 14 should be parallel to the outer edges 64, such that the top surfaces 42 have a rectangular shape as in, for example, the embodiment shown in FIGS. 1-8. In certain other embodiments, the trailer side fairing may have a curved or S-shape as schematically shown by example in FIG. 17. In these embodiments, some or all of the fairing brackets 10 must be mounted on the I-beam at an angle (between 0 and 90 degrees) relative to the longitudinal axis of the I-beam. Specifically, the support strut 12 of the bracket must be disposed at less than a right angle to the I-beam longitudinal axis such that the main body 16 is tilted relative to the side of the cargo trailer. In this case, the inner edges 362 of the two side clamping members 314 should be angled (non-parallel) relative to the outer edges 364, such that the top surfaces 342 have a trapezoidal shape as shown by example in FIGS. 13 and 14. Due to the angle of the inner edges 362, the support strut may be mounted at an angle on the I-beam so that the fairing bracket 310 can accommodate the curves in the side fairing.

The support strut 12 as well as the side clamping members 14 may be manufactured by injection molding, whereby each of the support strut and the side clamping members are of a single molded piece construction. In some embodiments, the support strut 12 may be of a modular construction in which the mold used to form the support strut includes a plurality of inserts (e.g., three inserts) that allow for the formation of a plurality of configurations of the support strut such as the various embodiments described above. Thus, advantageously the same mold may be used to produce multiple configurations of the support strut. The "straight" side clamping members 14 (the side clamping members having inner edges 62 parallel to outer edges 64) may be produced with a single mold. On the other hand, the "angled" side clamping members 14 (the side clamping members having inner edges 62 that are angled relative to outer edges 64) may be produced using two molds, one for a left-handed curve in a side fairing and one for a right-handed curve. Thus, if the trailer bracket 10 is installed on an I-beam using one set of angled side clamping members, the support strut is tilted to one side of the I-beam (e.g., the left side) whereas if the trailer bracket is installed using the other set of angled side clamping members, the support strut is tilted to the other side of the I-beam (e.g., the right side).

The various elements of the components of the fairing bracket 10 described above, e.g. the support strut 12 and side clamping members 14, may be manufactured from, and thus ultimately comprise, the same or different material(s), such as any one or more of the materials described below. In certain embodiments, as described above one or more of the components or sub-components of the fairing bracket 10 is monolithic in construction.

In general, materials suitable for use in or as the support strut 12 and side clamping members 14 include metals (e.g. steels, aluminums, alloys, etc.), resins (e.g. thermoset and/or thermoplastic resins), rubbers/elastomers, and combinations thereof. However, myriad materials may be used to manufacture the elements of the fairing bracket 10, each typically selected as a function of availability, cost, performance/end use applications, etc. Moreover, metals, metal alloys, rubbers/elastomers, and resins are not exhaustive of suitable materials that may be used. In general, support strut 12 and side clamping members 14 may be formed of a thermoplastic resin or elastomer. The fasteners may comprise a metal such as a stainless steel, but may be chosen from a group including stainless steel, nickel plated steel, zinc plated steel, nylon, titanium, and combinations thereof.

In certain embodiments, the components of the fairing bracket 10 comprise a resin, such as a thermoplastic and/or thermoset resin. In such embodiments, the components may each independently comprise an independently selected resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the various components of the fairing bracket 10 comprise materials suitable for use under continuous exposure to temperatures of from −40° C. to 120° C., or from −40° C. to 135° C. and/or pressures of from 0.5 to 2 bar. In certain embodiments, one or more, alternatively all, of the various components of the fairing bracket 10 comprises materials that can withstand up to 30 minutes, alternatively more than 30 minutes, of exposure to temperatures of up to 150° C. without irreversible harmful effects (e.g. melting, etc.).

With regard to the composition of the particular components of the fairing bracket 10 described above comprising a resin, examples of suitable resins include thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof. In particular embodiments, the fairing bracket 10 may be formed of a thermoplastic olefin (TPO).

With regard to the composition of the particular components of the fairing bracket 10 described above comprising a rubber/elastomer, examples of suitable rubber/elastomers include neoprene rubbers, buna-N rubbers, silicone rubbers, ethylene propylene diene monomer (EPDM) rubbers, natural gum rubbers, viton rubbers, natural latex rubbers, vinyl rubbers, santoprene rubbers, epichlorohydrin (ECH) rubbers, butyl rubbers, latex-free thermoplastic elastomer (TPEs), thermoplastic elastomers, hypalon rubbers, ethylene propylene rubbers, fluoroelastomer rubbers, fluorosilicone rubbers, hydrogenated nitrile rubbers, nitrile rubbers, perfluoroelastomer rubbers, polyacrylic rubbers, polychloroprenes, polyurethanes, aflas rubbers (e.g. TFE/Ps), chlorosulfonated polyethelene rubbers, styrene butadiene rubbers (SBRs), polyacrylates, ethylene acrylic rubbers, polyvinyl chloride (PVC), ethylene-vinyl acetate (EVA), and combinations thereof. In particular embodiments, the fairing bracket 10 may be formed of a thermoplastic elastomer (TPE).

In various embodiments, any of the components of the fairing bracket 10 described above may comprise a material (e.g. a resin, rubber, etc.) including a filler. Examples of suitable fillers include reinforcing fillers added for providing mechanical strength, such as inorganic fillers (e.g. fumed silica fine powder, precipitated silica fine powder, fused silica fined powder, baked silica fine powder, fumed titanium dioxide fine powder, quartz fine powder, calcium carbonate fine powder, diatomaceous earth fine powder, aluminum oxide fine powder, aluminum hydroxide powder, zinc oxide fine powder, zinc carbonate fine powder, glass fibers, etc.), organic fibers (e.g. carbon fibers), natural fibers, and the like, as well as combinations thereof. In particular embodiments, the fillers include but are not limited to talc, fiberglass, carbon fiber, wollastonite, and MOS (Metal Oxy Sulfate).

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A trailer fairing bracket for mounting an aerodynamic side fairing to a cargo trailer, the trailer fairing bracket comprising:
 a support strut having a main body, and an outwardly extending clamping wedge portion extending generally perpendicular to the main body, the main body being configured to support a trailer side fairing, wherein the main body includes an elongated center portion having first and second ends, a central axis extending between the first and second ends, a lower skirt-mounting portion proximate the first end and extending perpendicular to the central axis, and an upper skirt-mounting portion disposed at the second end extending perpendicular to the central axis; and
 a pair of side clamping members that cooperate with the clamping wedge portion of the support strut for securing the support strut to a cargo trailer;
 wherein the lower skirt-mounting portion extends beyond the center portion in a direction perpendicular to the central axis;
 wherein the support strut is of a single molded piece construction.

2. The trailer fairing bracket of claim 1, wherein (i) the support strut is formed by injection molding; (ii) each side clamping member is formed by injection molding; or (iii) both (i) and (ii).

3. The trailer fairing bracket of claim 1, wherein the main body is one of a T-shape, an H-shape, or an I-shape.

4. The trailer fairing bracket of claim 1, wherein each side clamping member includes a top surface extending from a first end to a second end, the top surface having an inner edge and an outer edge each extending from the first end to the second end, wherein the inner edge is one of parallel or angled relative to the outer edge.

5. A trailer fairing bracket for mounting an aerodynamic side fairing to a cargo trailer, the trailer fairing bracket comprising:
 a support strut formed of a single molded piece;
 the support strut including a main body generally lying in a plane and an outwardly extending clamping wedge portion extending generally perpendicular to the plane of the main body;
 the main body including an elongated center portion having first and second ends, a central axis extending between the first and second ends, a lower skirt-mounting portion at the first end extending perpendicular to the central axis, and an upper skirt-mounting portion at the second end extending perpendicular to the central axis, wherein the lower skirt-mounting portion extends beyond the center portion in a direction perpendicular to the central axis;
 the clamping wedge portion including a pair of opposite, side-facing angled surfaces, and the clamping wedge portion being disposed at the second end of the center portion of the main body; and
 a pair of side clamping blocks adjustably connected to the clamping wedge portion of the support strut;
 each side clamping block including an inwardly facing angled surface that is inclined at the same angle as one of the angled surfaces of the clamping wedge portion;
 each side clamping block including a top surface extending from a first end of the side clamping block to a second end of the side clamping block, the top surface having an inner edge and an outer edge each extending from the first end to the second end, wherein said inner edges of the side clamping blocks are either (i) both parallel to said outer edges or (ii) both angled relative to said outer edges.

6. The trailer fairing bracket of claim 5, wherein the clamping wedge portion of the support strut includes at least one through hole for connection of the side clamping blocks to the clamping wedge portion.

7. The trailer fairing bracket of claim 6, wherein each side clamping block includes at least one slot corresponding to the at least one through hole of the clamping wedge portion.

8. The trailer fairing bracket of claim 7, including at least one fastener that adjustably attaches the side clamping blocks to the clamping wedge portion of the support strut via the at least one through hole and the at least one slot.

9. The trailer fairing bracket of claim 5, wherein each side clamping member includes an engagement surface opposite the top surface for engagement with a surface of a cargo trailer.

10. The trailer fairing bracket of claim 9, wherein the engagement surface of each side clamping block includes a plurality of grooves extending from the first end to the second end of the side clamping block.

11. The trailer fairing bracket of claim 5, wherein each side clamping block has a wedge-shaped connection portion including the inwardly facing angled surface, and a planar top portion including the top surface and the engagement surface, the inwardly facing angled surface being tapered toward the top surface, the connection portion of each side clamping block cooperating with the clamping wedge portion of the support strut.

12. The trailer fairing bracket of claim 5, wherein the top surface of each side clamping block has one of a rectangular shape or a trapezoidal shape.

13. The trailer fairing bracket of claim 5, wherein the clamping wedge portion of the support strut has an isosceles trapezoidal cross-sectional shape.

14. The trailer fairing bracket of claim 5, wherein the lower skirt-mounting portion is shorter in length than the upper skirt-mounting portion.

15. The trailer fairing bracket of claim 5, wherein the lower skirt-mounting portion and the upper skirt-mounting portion of the support strut each include at least one mounting aperture for mounting a trailer side fairing on the support strut.

16. The trailer fairing bracket of claim 5, wherein the support strut is generally symmetric about the central axis.

17. The trailer fairing bracket of claim 5, wherein the elongated center portion of the main body extends beyond the lower skirt-mounting portion, and the elongated center portion includes at least one mounting aperture below the lower skirt-mounting portion for mounting a trailer side fairing on the support strut.

18. The trailer fairing bracket of claim 5, wherein the support strut includes a rebound gusset extending between the clamping wedge portion and the main body.

19. A method of manufacturing a trailer fairing bracket including:

a support strut having a main body, and an outwardly extending clamping wedge portion extending generally perpendicular to the main body, the main body being configured to support a trailer side fairing, wherein the main body includes an elongated center portion having first and second ends, a central axis extending between the first and second ends, a lower skirt-mounting portion proximate the first end and extending perpendicular to the central axis, wherein the lower skirt-mounting portion extends beyond the center portion in a direction perpendicular to the central axis, and an upper skirt-mounting portion disposed at the second end extending perpendicular to the central axis; and a pair of side clamping members that cooperate with the clamping wedge portion of the support strut for securing the support strut to a cargo trailer;

the method comprising:

forming at least one of the support strut and the pair of side clamping members by injection molding, wherein each of the support strut and the side clamping members are of a single molded piece construction.

20. The method of claim 19, including the step of providing a mold having a plurality of inserts that allows for the production of a plurality of configurations of the support strut using the mold.

21. A trailer side fairing system comprising:

a plurality of the fairing brackets as in claim 1, each said fairing bracket being mounted on an I-beam of a cargo trailer floor frame; and an aerodynamic side fairing skirt mounted on the plurality of fairing brackets.

* * * * *